June 19, 1962 W. W. WINDLE ET AL 3,039,383
BALING MACHINE
Filed May 12, 1960
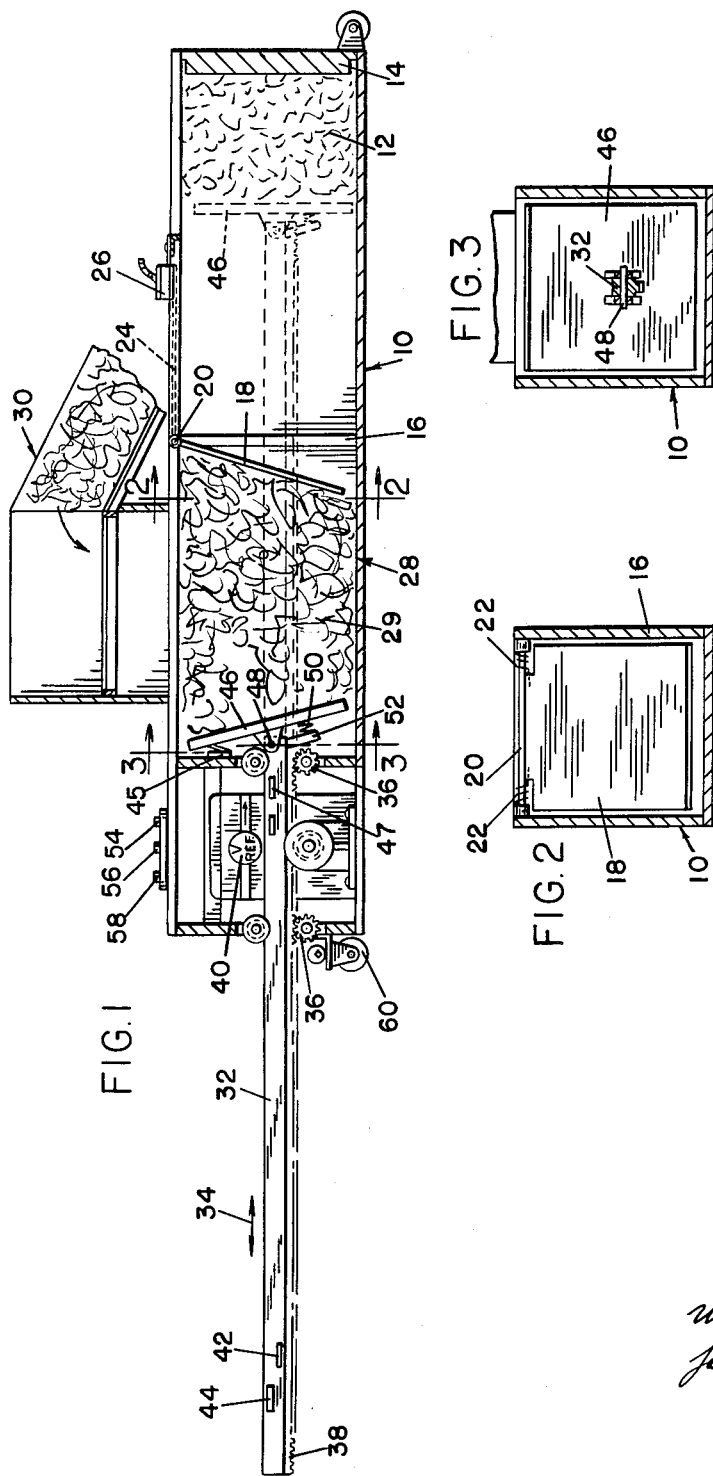
INVENTORS
Winfred W. Windle
Jonathan W. Windle
by Charles R. Fay,
ATTORNEY

United States Patent Office 3,039,383
Patented June 19, 1962

3,039,383
BALING MACHINE
Winfred W. Windle and Jonathan W. Windle, Sutton, Mass. (both of Canal St., Millbury, Mass.)
Filed May 12, 1960, Ser. No. 35,385
2 Claims. (Cl. 100—240)

This invention relates to a new and improved baling machine. One of the principal objects of the invention resides in the provision of a baling machine which is operable in a horizontal position and which therefore may be made portable to be placed in any position on a factory floor or elsewhere as distinct from prior art vertical balers which require permanent installation for either dropping the finished bales through an opening in the floor or filling the bale and pressing the same by means extending through the ceiling as is common in the prior art.

Other objects of the invention include the provision of a baler including a new and improved horizontal reciprocatory plunger providing an even pressed bale from top to bottom thereof with repetitious strokes of the plunger; and the provision of a new and improved plunger for pressing the material to form the bale which provides for an even pressure at each stroke of the plunger to form the bale from material deposited in a hopper, regardless of how many times it takes to load the hopper to form a single bale; and the provision of a horizontal baler as above described provided with pressure-relief means for applying equal pressure to every stroke of the plunger regardless of whether the bale is just being started or whether a particular stroke involved is near the finish of the filling and pressing operation.

A still further object of the invention resides in the provision of a new and improved gate which is arranged at an angle to the horizontal in combination with a front plate on the plunger which is also arranged at an angle to the horizontal, said gate being moved by the action of the plunger in pressing the material to be baled past the gate and into the baling area of the device.

The invention further relates to arrangements and combinations of parts which will be hereinafter described and more particularly set forth in the appended claims.

Reference is to be had to the accompanying drawings, in which

FIG. 1 is a longitudinal sectional view through a device according to the invention; and FIGS. 2 and 3 are sections on the respective lines in FIG. 1.

In carrying out the present invention, we provide a heavy structural metal framework generally indicated at 10. As shown in FIG. 1, the right-hand end of this framework forms the press or baler itself, and the reference numeral 12 indicates the stock therein which is being compressed. When the bale is full, the right-hand portion of the framework 10 from the extreme end at 14 to the position of member 16 will be substantially filled, and at this time the framework is opened, the bale covering secured, and the bale removed, so that a new bale may be started.

Adjacent the framework 16 there is a gate 18 which is mounted to pivot on a pin at 20, see FIG. 2. The pin at 20 is provided with springs 22 which hold the gate in the relatively inclined position shown in FIG. 1 and resist motion of the gate in a counterclockwise direction. These springs, however, yield in order to allow such motion when sufficient pressure is exerted upon the left-hand side of the gate 18 to cause the motion of the gate to take place. When the gate 18 reaches the generally horizontal position shown in broken lines as at 24, an electromagnet 26 or other convenient means operates to hold the gate in this position temporarily.

To the left of gate 18 there is a hopper for the material to be compressed and this is generally indicated by the reference numeral 28. The hopper may be loaded from a power-operated conveyor or the like which is indicated by the reference numeral 30. This conveyor may be of any desired construction but is preferably power-operated and controlled in timed relation to the strokes of the ram so that the material drops from conveyor 30 into the area of the hopper at the correct intervals. This conveyor may be conveniently in the form of a canvas belt or the like.

At the extreme left-hand end of the framework 10, there is provided a ram 32 and mechanism for moving the ram in the direction of the arrow 34. This mechanism may take the form of friction wheels or the like or the spur gears 36 which can mesh with a rack 38 on the lower edge of the ram 32. The operation or mechanism for reciprocating this ram is not shown in detail as it is conventional and forms a commercial unit but it is provided with a relief valve 40 for a purpose to be described.

When ram 32 reaches a certain point in its motion toward the right in FIG. 1 where the pressure on the material 12 reaches a predetermined point, as for instance as shown in dotted lines in FIG. 1, the relief valve is actuated to reverse the driving mechanism for the ram and cause it to return to the original retracted position which is shown in full lines.

Various control members are provided for operating switches controlling the prime mover. For instance, a cam at 42 is adapted to engage a switch not shown at the extreme limit of travel to the right of the ram 32 in order to reverse the direction thereof and a cam 44 which is to the left of cam 42 may be used as a reversal member in order to reverse the direction of reciprocation of the ram, while a cam at 47 is a limit switch operator and stops the ram in the position shown in solid lines in FIG. 1. The ram can be operated to reciprocate continuously or as a single-cycle operation, but it is to be understood that the travel of the ram continues until either a pre-set pressure is encountered against the material 12 being compressed as explained above, or the extremity of travel is reached and the cam 42 stops the drive. In either case, when forward travel is stopped, the ram automatically reverses direction and this is done without a cam in all positions except at the extreme forward point of travel when cam 42 stops the ram motion and cam 44 reverses the drive. When the ram reaches the full line position, it actuates a switch 45 to de-energize the electromagnet 26, allowing the gate to swing down to the solid line position thereof.

At the forward end of the ram 32 there is a plunger plate in the form of a board or the like, this being indicated at 46. It is mounted on a swivel pin 48 upon the forward end of the ram 32 and it is capable of swinging between the solid line position in FIG. 1 and the dotted line operating thereof in the same figure. A spring 50 located between the plate 46 and an abutment at 52 on the forward end of the ram 32 normally tends to hold plate 46 in the inclined relationship and with gate 18 this forms a truncated V-shaped trough in the hopper for the material 29 to be compressed.

When the ram moves toward the right, it will be seen that there is more material at the top of this mass than at the bottom. As the ram moves to the right, the gate 18 is gradually swung in the counter-clockwise direction until the plate 46 arrives at the position 16 at which time the gate 18 is in the horizontal position (dotted lines at 24) and is held temporarily by the electromagnet. The plunger plate keeps on going to the right as shown but due to the action of gravity, the mass of material 28 has now become generally even from top to bottom of the mass at 12 and this causes the plate 46 to straighten out, i.e., into a vertical position. By this means, the bale is made evenly compressed from top to bottom thereof rather than more highly compressed at the bottom as would be the case were the original non-compressed material at 28 not arranged in the V-shaped formation shown.

The travel of the ram is initiated by the actuation of a push button 54. Another button at 56 is to reverse the ram at any time to return the plunger to its retracted position if this should become desirable and necessary and the push button at 58 is an emergency stop and lock button. Also, adjustable casters or rolls 60 can be used to roll the machine on a floor, or they can be set as shown to anchor the frame in place.

The circuits for the reciprocating machinery for the plunger have not been shown as such circuits and actuating machinery are old and well known in the art, and the machine is preferably made in attached parts to further facilitate mobility.

Having thus described our invention and the advantages thereof, we do not wish to be limited to the details herein disclosed, otherwise than as set forth in the claims, but what we claim is:

1. A baling machine comprising a framework, means in the framework to accommodate compressed material and forming a baling area, a hopper area, a horizontal ram extending into the framework, means on the framework remote from the baling area to reciprocatingly mount the ram, a plunger in the framework to move uncompressed material from the hopper area into the baling area, means mounting the plunger on a pivot axis on the ram, yielding means normally positioning the plunger at an incline relative to the direction of motion of the plunger, means to reciprocate the ram, a movable inclined gate on the framework between the hopper area and the baling area, said gate being pivotally mounted at one side of the hopper area and extending across the hopper area to the other side thereof, said gate and plunger serving to position the uncompressed material in the form of a V in the hopper area, said gate being moved by the plunger out of the way as the plunger moves the uncompressed material into the baling area, and means in the framework forming a stop for the material, the plunger compressing the material against the stop.

2. A baling machine comprising a horizontal framework, means at one end of the framework forming a baling area, a hopper area in the framework, a ram, means on the framework remote from the baling area to reciprocatingly mount the ram in horizontal position, a plunger plate on the ram to move uncompressed material from the hopper area into the baling area and compress it, yielding means normally holding the plunger plate at an incline to the vertical, means to reciprocate the ram, a normally inclined movable gate on the framework between the hopper area and the baling area, said gate and plunger plate serving to position the uncompressed material in a V form, said gate being moved by the plunger out of the way as the plunger moves the uncompressed material past the gate into the baling area, means in the framework forming a stop for the material, the plunger compressing the material against the stop in a rectangular form, the gate being hinged at one edge and extending across the hopper area, and releasable means to temporarily hold the gate in out of the way position until the plunger has been retracted.

References Cited in the file of this patent

UNITED STATES PATENTS

| | | |
|---|---|---|
| 621,494 | Hillebrand et al | Mar. 21, 1899 |
| 675,258 | Whitman | May 28, 1901 |
| 747,230 | Ross | Dec. 15, 1903 |
| 865,614 | Schubert | Sept. 10, 1907 |
| 870,023 | Easterling | Nov. 5, 1907 |
| 872,850 | Rowekamp | Dec. 3, 1907 |
| 2,552,888 | Druetta | May 15, 1951 |
| 2,928,335 | Lamb | Mar. 15, 1960 |

FOREIGN PATENTS

| | | |
|---|---|---|
| 240,334 | Germany | Nov. 1, 1911 |
| 30,009 | Sweden | Dec. 24, 1910 |